US010472173B2

(12) United States Patent
Guo et al.

(10) Patent No.: US 10,472,173 B2
(45) Date of Patent: Nov. 12, 2019

(54) PUBLIC ACCESSIBLE AUTOMATED ROBOTIC WAREHOUSE FOR MAILS, PARCELS AND PACKAGES

(71) Applicants: Ching Qing Guo, Bellevue, WA (US); ViVien Z S Guo, Bellevue, WA (US); Tiffany Tong Zhang, Bellevue, WA (US)

(72) Inventors: Ching Qing Guo, Bellevue, WA (US); ViVien Z S Guo, Bellevue, WA (US); Tiffany Tong Zhang, Bellevue, WA (US)

( * ) Notice: Subject to any disclaimer, the term of this patent is extended or adjusted under 35 U.S.C. 154(b) by 121 days.

(21) Appl. No.: 15/928,080

(22) Filed: Mar. 21, 2018

(65) Prior Publication Data

US 2018/0305125 A1 Oct. 25, 2018

Related U.S. Application Data

(60) Provisional application No. 62/489,408, filed on Apr. 24, 2017, provisional application No. 62/503,328, filed on May 9, 2017.

(51) Int. Cl.

| | |
|---|---|
| *G06F 7/00* | (2006.01) |
| *B65G 1/137* | (2006.01) |
| *B25J 5/00* | (2006.01) |
| *B25J 13/08* | (2006.01) |
| *B25J 13/00* | (2006.01) |
| *G05D 1/02* | (2006.01) |

(52) U.S. Cl.

CPC ............ *B65G 1/1373* (2013.01); *B25J 5/007* (2013.01); *B25J 13/006* (2013.01); *B25J 13/08* (2013.01); *G05D 1/0289* (2013.01); *G05D 2201/0216* (2013.01); *Y10S 901/01* (2013.01); *Y10S 901/31* (2013.01); *Y10S 901/47* (2013.01)

(58) Field of Classification Search

None

See application file for complete search history.

(56) References Cited

U.S. PATENT DOCUMENTS

| | | | | |
|---|---|---|---|---|
| 2017/0357893 | A1 | 12/2017 | Dexter et al. | |
| 2017/0357910 | A1 | 12/2017 | Sommer | |
| 2018/0096299 | A1* | 4/2018 | Jarvis | G06Q 10/0875 |
| 2018/0127212 | A1* | 5/2018 | Jarvis | B65G 1/0435 |
| 2018/0253805 | A1* | 9/2018 | Kelly | G06Q 20/204 |

* cited by examiner

*Primary Examiner* — Yolanda R Cumbess

(74) *Attorney, Agent, or Firm* — Chen-Chi Lin

(57) ABSTRACT

A robotic warehouse includes a housing, a plurality of pallets, a plurality of bins, a rack assembly, a plurality of robots, a locker assembly and a centralized control system. A customer drops off a first package on a first pallet or in a first bin in a first locker of the locker assembly. A robot picks up the first package on the first pallet or in the first bin in the first locker of the locker assembly. The robot moves the first package on the first pallet or in the first bin to a first unit of the rack assembly. The robot moves a second package on a second pallet or in a second bin from a second unit of the rack assembly to a second locker of the locker assembly. Another customer picks up the second package from the second locker of the locker assembly.

20 Claims, 8 Drawing Sheets

PUBLIC ACCESSIBLE AUTOMATED ROBOTIC WAREHOUSE FOR MAILS, PARCELS AND PACKAGES

CROSS-REFERENCE TO RELATED APPLICATIONS

This patent application claims benefit of a Provisional Patent Application 62/489,408 filed on Apr. 24, 2017. The Disclosure made in the Provisional Patent Application 62/489,408 is hereby incorporated by reference. This patent application claims benefit of a Provisional Patent Application 62/503,328 filed on May 9, 2017. The Disclosure made in the Provisional Patent Application 62/489,408 is hereby incorporated by reference. Furthermore, the disclosure made in the patent application Ser. No. 15/334,682 to Dexter; Ross R. et al., published as US Patent Application Publication 2017/0357893 and the disclosure made in the patent application Ser. No. 15/334,692 to Sommer; Bruno M., published as US Patent Application Publication 2017/0357910 are hereby incorporated by reference.

FIELD OF THE INVENTION

This invention relates generally to a public accessible automated robotic warehouse. More particularly, the present invention relates to a public accessible automated robotic warehouse and a method of using the same.

BACKGROUND OF THE INVENTION

A capacity of current layout of a post office (PO) facility and a commercial mailbox facility is limited by a number of units that can be set up from a customer-facing wall. There are a lot of extra spaces, inside the facility, behind the customer-facing wall that can be constructed into storage areas. However, for the current system, the inside storage areas are not useful for storage because it is not directly connected to the customer-facing wall. Therefore, it is not easily accessed by the outside customers. PO boxes and commercial mailboxes become more and more popular as the pickup locations for e-commerce delivery. However, irregular sizes of e-commerce orders have been the challenge for a method using PO boxes and commercial mailboxes as the pickup locations because a respective size of an e-commerce order is usually fixed for each subscriber. Customers who rent small mailboxes have constrains to receive larger items. Postal offices have also installed some stand-alone lockers with large-size units to store and retrieve bulky packages. Those large-size lockers may not be efficient for a facility with space limitations. Many traditional brick-n-mortar stores, such as Wal-Mart and Target, have started "click and pickup" service to support in-store pickup for online orders. The setup for customers to pick up their online orders in the local stores is convenient for the customers. However, it is costly and is limited by the inefficiency of manual operations of order retrievals.

New technologies, such as cellphone app and security coded entry, have made it easier to open a locker box and to get items from a smart locker. Robot can help to build up automated operations to connect a locker in the front to a rack in the back for receiving and retrieving. A new automated-storage-and-retrieval-system (ASRS) for smaller packages in parcels and mails is designed to separate storage from access points. The ASRS automatically connects limited customer-access points in the front to large storage areas in the back of a facility.

SUMMARY OF THE INVENTION

A new design of an on-demand automated PO/mailbox/locker system comes from the warehouse's principle of separating fulfillment from storage. It includes a front-end access area, an inter-connected operation machine, and a back-end storage area. It is virtually managed by a controller system. A small number of access units at the front-end connect, through robotic operation, to a large storage area in the back. The small number of access units can be dynamically shared by a much large number of subscribers to pick up parcels from small letters to large packages on demand. Large packages exceeding a predetermined size or a predetermined weight will be rejected. This system is also an automated solution for parcel-transiting warehouse. (1) The front-end part of the configuration is a locker assembly. The locker assembly has one front and one back doors for each of the locker units. The front door of a locker unit is secured and can be unlocked electronically by key inputs or online requests. The back door is accessed by the operation machine and contains a radio-frequency identification (RFID) for automation guidance. The size of a locker unit is comparable to that of a rack unit for a "pallet" that is a pallet made out of plastic, acrylonitrile butadiene styrene (ABS), wood or metal and embedded with RFID for electronic access. The pallet may have a substantially flat top. The pallet may have a letter M-shape bottom portion or a character $\pi$-shape bottom portion. A large package can be stored and transferred on a pallet between a locker and a rack. A locker unit, just like a rack unit for pallet, is in principle larger than a "bin" that is a container with an opened top-side and an semi-opened front-side. The bin may have a letter M-shape bottom portion or a character $\pi$-shape bottom portion. The bin may be equipped with electronic access of storing mails and small parcels. (2) The interconnecting operation machine is one or several robots that connect the front-end and the back-end. A Robot is an automated 3-dimensional (for example, X-directional motion on the floor, Z-directional motion on the floor and Y-directional motion of a manipulator or a fork-shaped lifter) moveable cart or vehicle which has an arm for retrieving bin/pallet from racks or lockers, and a (optional) flat top pad to hold one or many bins or pallets. In one example, the robot is an auto-guided-vehicle (AGV). In another example, the robot is an transporter. The robot moves retrieved bin/pallet to a destined area, i.e. a rack to store, or a front-end locker ready for the customer to pick up. A Robot has wheels that can at least support front/back and left/right moves. It may also use turns to move front/back and left/right. Robots can reach various heights and hold packages of various sizes. A Robot has a system that can communicate with the controller wirelessly and also recognizes unit locations on racks or lockers with electronic address by an RFID, a first quick response (QR) code or a barcode. A Robot can be configured to support Auto-Store-and-Retrieve-System (ASRS) with one bin/pallet per trip between a locker and a rack or between a first selected rack and a second selected rack, or optimized with two or more bins/pallets per trip between locker(s) and rack(s). By mapping bin/pallet to an address of a unit on a rack assembly or a locker assembly, a robot can also deliver bin/pallet from a predetermined location, such as a manually sorting table, to a rack assembly to store or to a locker assembly for pickup. (3) The storage area can be configured into one or multiple zones. Each zone may be a duplex of two racks attached together so that each rack can be accessed by one side, similar to a typical warehouse setup. Each rack may have multiple rows. Each of the rows is also separated physically into units to accommodate bin(s) or pallet(s) inside. The address of a unit is setup with a RFID for a robot to lookup. With RFID embedded for unit address electronically, the rack becomes a rack assembly. (4) A bin, electronic bin with RFID, will be placed into each unit. A bin will typically store mails or small packages. The bin will have sensors to collect status for update/notification to customers. The bin is designed with all five sides, with the top-side open and the front-side semi-open for easy drop-off while the half-closed front side will prevent mails or parcels to slip out. The bin also has a letter M-shape bottom portion or a character π-shape bottom portion for Robot to retrieve. Units, typically large sized, on a rack will not be configured to hold bins. They may hold pallets instead for packages with large size. A pallet, with a letter M-shape bottom portion or a character π-shape bottom portion, may be made of plastic, ABS, wood or metal and embedded with an RFID for electronic address. The RFID can be placed anywhere on the bin/pallet. But, a suggested location to receive the RFID is the middle column of the M-shape bottom portion or a middle of the front end of a topside of the character π-shape bottom portion so as to precisely guide the arm of a Robot. The units on a rack can be configured into a fixed format, i.e., each unit for one designed owner during a period of subscription; or a dynamic format, i.e., each unit storing based on an arrival on-demand. The fixed format is a typical setup for mailboxes. The dynamic format is for an e-commerce order pickup locker. (5) The controller is a centralized control system connecting, sending and receiving information to/from the customers, the front-end locker, the robots, the racks and the bins/pallets. With accessing programs, such as website or app, the controller system can display status and receive information of customer's inputs for accessing her/his mails or packages. It can manage dynamic routes to connect front-access and back-storage, create routs and trigger robot(s) to locate and take the requested bin/pallet to the front area for the customer to receive mails/packages. It can also collect signals of arrivals for bins/pallets so as to notify the corresponding owners of new arrivals. The controller can take customers' schedule requests to retrieve mails/packages earlier and stores them in a cached area, near or in the front area, for quick retrieval upon customers' arrivals.

A robotic automation system can be implemented for automated storage and retrieval system (ASRS) with public access for not too heavy items, such as mail letters, parcels, packages and cartons. It can reduce space constraints from front-end access points and provide flexible storage and retrieval of packages with different sizes. This system can also provide status, notifications and advanced-scheduling for the convenience and better services of customers and carriers. Implementation scenarios include, but not limited to: (1) Postal office (PO), commercial mailbox: to significantly increase the capacity that they can offer without the typical limit of front outlets for customer's access. This system can also provide pickup of large sized packages that couldn't be stored in smaller mailboxes. (2) E-commerce locker: the ASRS system can make a 24/7 ASRS facility for both dropping-off and picking-ups with human access/operation only from outside and completely automation inside. Both of carriers and customers can come to the automated facility at their own flexible schedules. The capacity improvement for PO and commercial mailbox can also be applied here, as the number of packages that can be dropped and stored is no longer limited by the availability of the locker's units in the front end. (3) In-store pickup of online orders: to automate operations for improved efficiency and reduced or even eliminated manually work. (4) Warehouse and fulfillment: to automatically store and retrieve transit-orders under designed limits of size and weight. (5) Commercial locker for personal-to-personal (P2P) exchange: very similar to an E-commerce locker, except dropping-offs and picking-ups all between end-customers. The ASRS system has the advantages of increased capacity, longer storage time, online/mobile notifications and virtual/electronic locking mechanism.

DETAILED DESCRIPTION OF THE INVENTION

Figure 1:
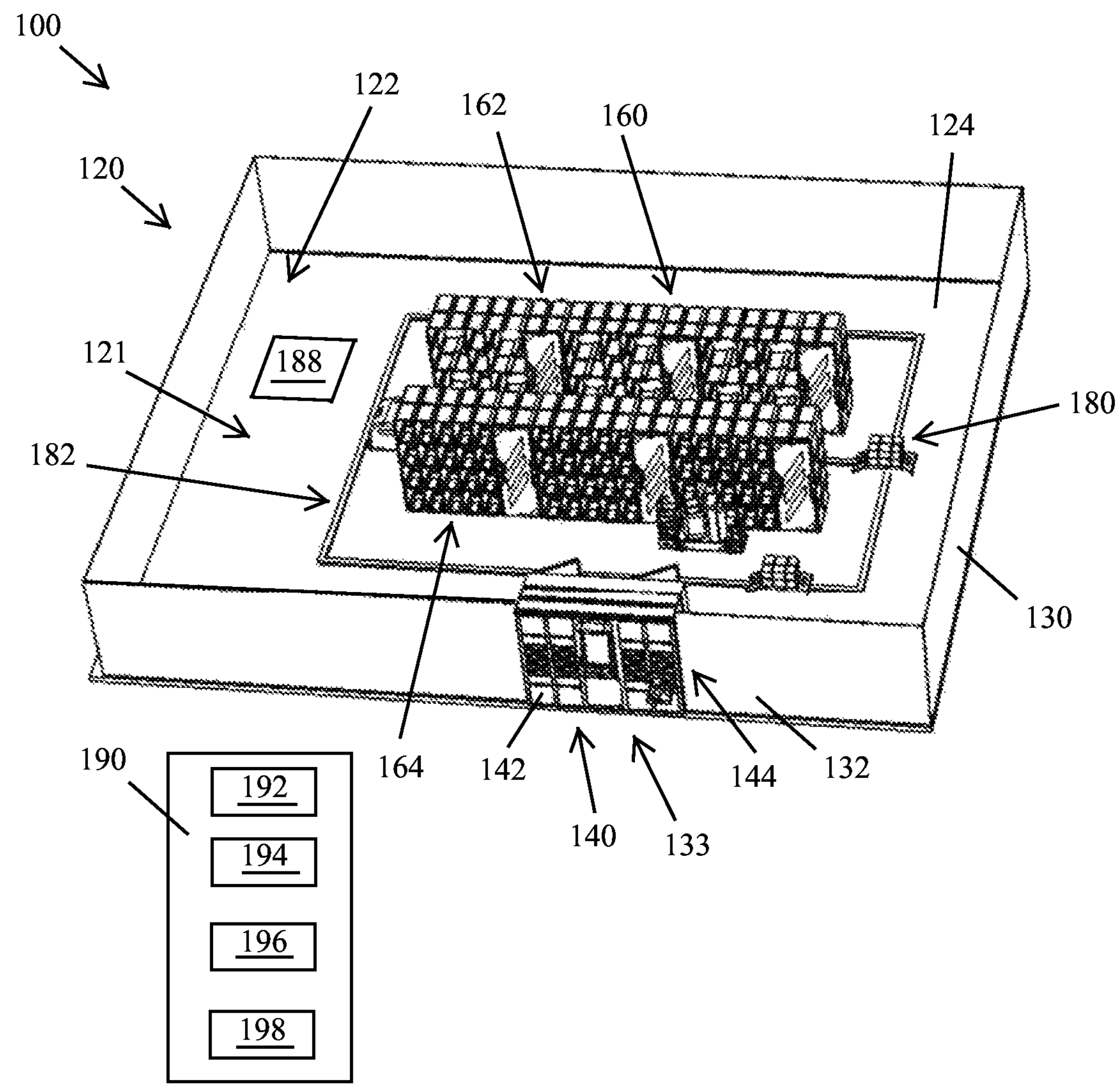
FIG. 1 is a perspective view of a robotic warehouse in examples of the present disclosure.

FIG. 1 is a perspective view of a robotic warehouse 100 in examples of the present disclosure. The robotic warehouse 100 includes a housing 120, a plurality of pallets 452, 454 and 456 of FIG. 4, a plurality of bins 672 of FIG. 6, a rack assembly 160, a plurality of robots 180 and a locker assembly 140. The housing 120 has an enclosed space 121. The housing 120 has a ceiling 122, a plurality of walls 130 and a floor 124. The enclosed space 121 is enclosed by the ceiling 122, the plurality of walls 130 and the floor 124. The ceiling 122 of FIG. 1 is shown in transparent so as to show elements in the enclosed space 121.

In examples of the present disclosure, the robotic warehouse 100 further includes a manually sorting area 188. The manually sorting area 188 may be optional. The plurality of robots 180 move a plurality of packages from the manually sorting area 188 to the rack assembly 160 or the locker assembly 140.

Each of the plurality of pallets 452 has a first size. Each of the plurality of bins 672 has a second size. The second size is smaller than the first size. In one example, each of the plurality of pallets 452 is to hold a package of 50 centimeters in length, 50 centimeters in width and 50 centimeters in height. Each of the plurality of bins 672 is to hold a package of 25 centimeters in length, 25 centimeters in width and 25 centimeters in height. In another example, each of the plurality of pallets 452 is to hold a package of 100 centimeters in length, 100 centimeters in width and 100 centimeters in height. Each of the plurality of bins 672 is to hold a package of 30 centimeters in length, 30 centimeters in width and 30 centimeters in height. The rack assembly 160 is disposed in the enclosed space 121 of the housing 120. The rack assembly has a first plurality of units 162 and a second plurality of units 164. Each of the first plurality of units 162 is configured to receive one of the plurality of pallets 452. Each of the second plurality of units 164 is configured to receive one of the plurality of bins 672. In one example, each locker of the locker assembly 140 is of a same size. Each locker is configured to receive a selected one of the plurality of pallets 452 or a selected one of the plurality of bins 672. In another example, the locker assembly 140 has a first plurality of lockers 142 and a second plurality of lockers 144. Each locker of the first plurality of lockers 142 and the second plurality of lockers 144 has a front door 212 of FIG. 2. Each of the first plurality of lockers 142 is configured to receive a selected one of the plurality of pallets 452. Each of the second plurality of lockers 144 is configured to receive a selected one of the plurality of bins 672. Having the first plurality of lockers 142 and the second plurality of lockers 144 improves efficiency for batch processing.

In examples of the present disclosure, the plurality of walls 130 has a first wall 132. The first wall 132 has an opening 133 to receive a front end of the locker assembly 140 so that the front door 212 of FIG. 2 of each locker of the first plurality of lockers 142 and the second plurality of lockers 144 is accessible from an exterior of the housing 120. A back end of the locker assembly 140 is disposed in the enclosed space 121 of the housing 120.

In examples of the present disclosure, the locker assembly 140 is at the front for customer access. The rack assembly 160 may hold small units (for example, mailboxes) and large sized packages or boxes. A plurality of robots (for example, two automatically operated robots—robots are shown in FIG. 1) move around to operate between the rack assembly 160 and the locker assembly 140.

In examples of the present disclosure, a customer sends a request to a centralized control system 190 to drop off a selected package. The centralized control system 190 informs the customer a first identification number of to selected locker of the locker assembly 140 and a first software personal identification (PIN) number; or a first quick response (QR) code. The customer uses the first software PIN number or scans the first QR code to unlock the front door of the selected locker of the locker assembly 140.

In examples of the present disclosure, the robotic warehouse 100 is characterized by a first condition, a second condition, a third condition and a fourth condition. A method of using the robotic warehouse 100 includes the first condition, the second condition, the third condition and the fourth condition. In examples of the present disclosure, a size of a locker of the first plurality of lockers 142 of the locker assembly 140 is larger than a size of a locker of the second plurality of lockers 144 of the locker assembly 140. In examples of the present disclosure, a size of a unit of the first plurality of units 162 of the rack assembly 160 is larger than a size of a unit of the second plurality of units 164 of the rack assembly 160.

In the first condition, a customer drops off a first package on a first pallet in a first locker of the first plurality of lockers 142. The plurality of robots 180 move the first package on the first pallet from the first locker of the first plurality of lockers 142 to a first unit of the first plurality of units of the rack assembly 160.

Alternatively, in the first condition, a customer drops off a first package on a first pallet in a first locker of the first plurality of lockers 142. The lower fork-shape lifter 540 of the robot 500 of FIG. 5 picks up an empty pallet. The upper fork-shape lifter 520 of the robot 500 of FIG. 5 picks up the first package on the first pallet from the first locker of the first plurality of lockers 142. The lower fork-shape lifter 540 of the robot 500 of FIG. 5 drops off the empty pallet in the first locker of the first plurality of lockers 142. The plurality of robots 180 move (the robot 500 of FIG. 5 moves) the first package on the first pallet from the first locker of the first plurality of lockers 142 to a first unit of the first plurality of units of the rack assembly 160.

In the second condition, the customer drops off a second package in a first bin in a second locker of the second plurality of lockers 144. The plurality of robots 180 move the second package in the first bin from the second locker of the second plurality of lockers 144 to a second unit of the second plurality of units of the rack assembly 160.

Alternatively, in the second condition, the customer drops off a second package in a first bin in a second locker of the second plurality of lockers 144. The lower fork-shape lifter 540 of the robot 500 of FIG. 5 picks up an empty bin. The upper fork-shape lifter 520 of the robot 500 of FIG. 5 picks up the second package in the first bin from the second locker of the second plurality of lockers 142. The lower fork-shape lifter 540 of the robot 500 of FIG. 5 drops off the empty bin in the second locker of the second plurality of lockers 142. The plurality of robots 180 move (the robot 500 of FIG. 5 moves) the second package in the first bin from the second locker of the second plurality of lockers 144 to a second unit of the second plurality of units of the rack assembly 160.

In the third condition, the plurality of robots move a third package on a second pallet from a third unit of the first plurality of units 162 of the rack assembly 160 to a third locker of the first plurality of lockers 142. The customer picks up the third package on the second pallet from the third locker of the first plurality of lockers 142.

In the fourth condition, the plurality of robots move a fourth package in a second bin from a fourth unit of the second plurality of units 164 of the rack assembly 160 to a fourth locker of the second plurality of lockers 144. The customer picks up the fourth package in the second bin from the fourth locker of the second plurality of lockers 144.

In examples of the present disclosure, the customer sends the centralized control system 190 a predetermined time period to pick up. The centralized control system 190 informs the customer an identification number of an additional selected locker of the locker assembly 140 and an additional software PIN number; or an additional QR code. The customer uses the additional software PIN number or scans the additional QR code to unlock the front door of the additional selected locker of the locker assembly 140.

Figure 4:
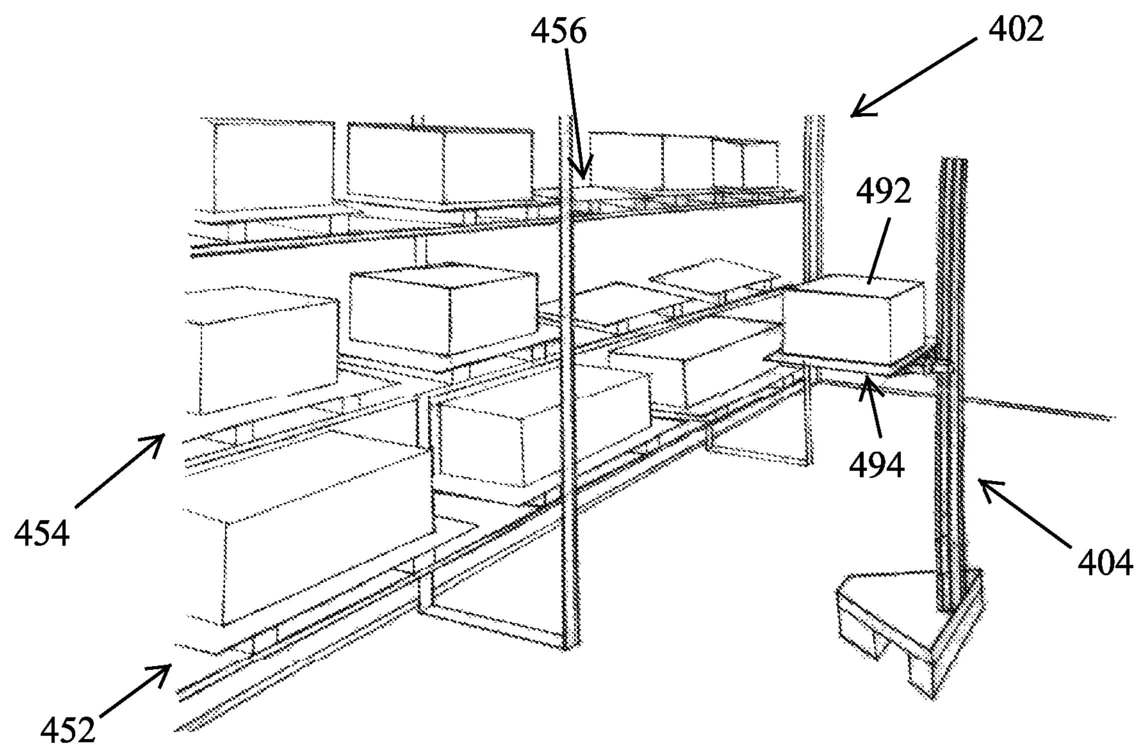
FIG. 4 is a perspective view of a rack assembly and a robot in examples of the present disclosure.

In examples of the present disclosure, the plurality of pallets 452 of FIG. 4 of the robotic warehouse 100 has a plurality of sizes. For example, in FIG. 4, a size of pallet 452 is larger than a size of the pallet 454. A size of pallet 454 is larger than a size of the pallet 456. In examples of the present disclosure, the plurality of bins 672 of FIG. 6 of the robotic warehouse 100 has a plurality of sizes. For example, a first additional size of a first additional plurality of bins is eighty percent of the size of the plurality of bins 672 of FIG. 6. For example, a second additional size of a second additional plurality of bins is sixty percent of the size of the plurality of bins 672 of FIG. 6.

Figure 6:
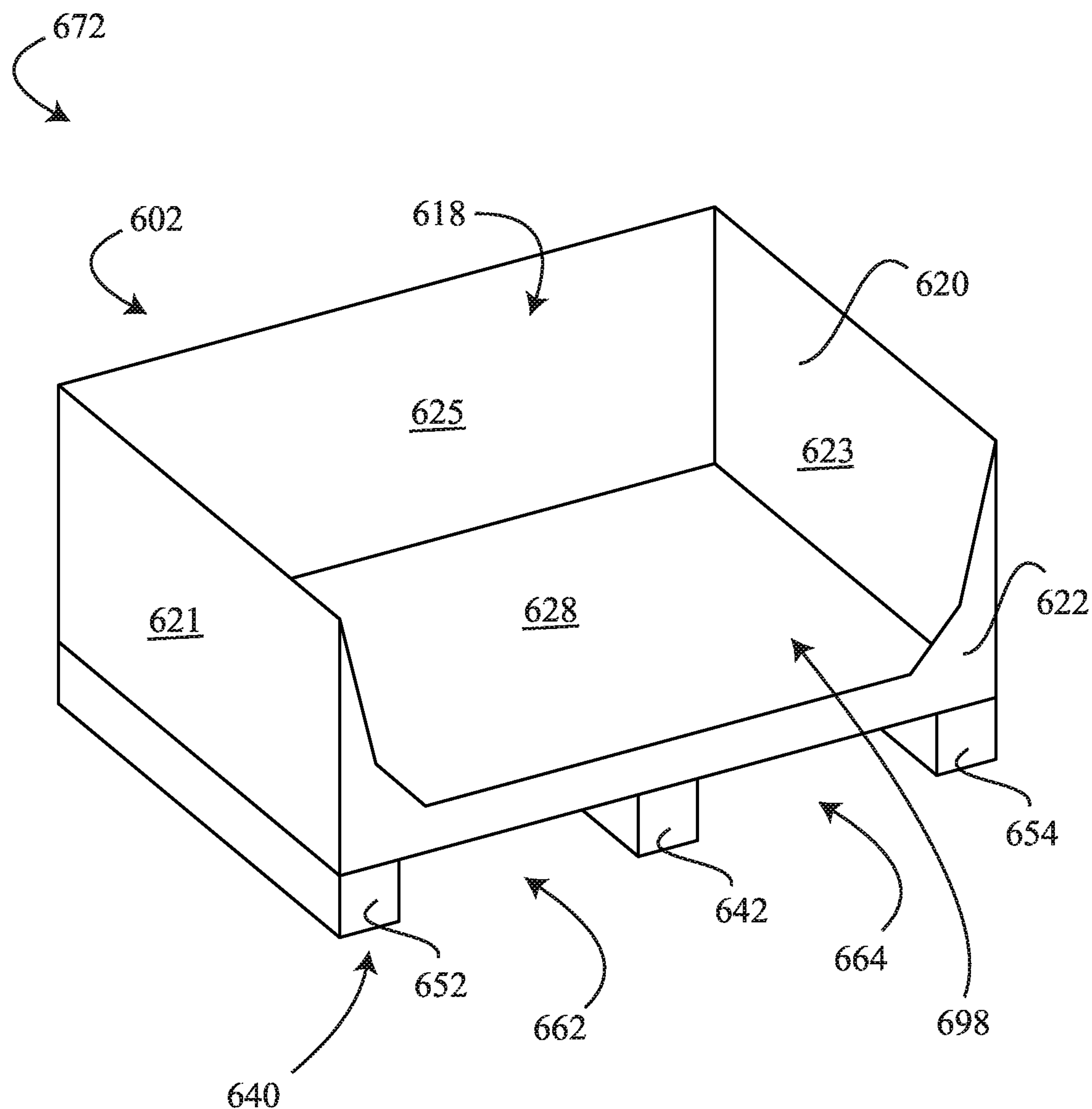
FIG. 6 is a perspective view of a bin in examples of the present disclosure.

In examples of the present disclosure, the robotic warehouse 100 only has a single size pallet (a same size of the plurality of pallets 452 of FIG. 4) and a single size bin (a same size of the plurality of bins 672 of FIG. 6). In examples of the present disclosure, the robotic warehouse 100 excludes a container other than the single size pallet and the single size bin. The single size pallet is larger than the single size bin. Therefore, a package of a customer does not fit into the single size pallet will be rejected. A size of mails and packages smaller than the single size bin will be placed in the plurality of bins 672 of FIG. 6. A size of mails and packages larger than the single size bin and smaller than the single size pallet will be placed in the plurality of pallets 452 of FIG. 4. Therefore, it is efficient for sorting (only a single size pallet and a single sixe pallet).

The disclosure made in the patent application Ser. No. 15/334,682 and the disclosure made in the patent application Ser. No. 15/334,692 are hereby incorporated by reference. In examples of the present disclosure, the robotic warehouse 100 further includes a centralized control system 190. The centralized control system 190 includes a processor 192, memory 194, an artificial intelligence engine 196 and an interface engine 198. The processor 192 processes data. The memory 194 stores the data. The artificial intelligence engine 196 specifies a plurality of routes of the plurality of robots 180 and avoids collisions of the plurality of robots 180. The artificial intelligence engine 196 also sets alert for self-monitoring (for example, overheating). The interface engine 198 communicates with a plurality of users, the plurality of robots 180, the plurality of conveyors 320 of FIG. 3 and the hinged slide 370 of FIG. 3. The interface engine 198 may contain a telecommunication module for connecting the robotic warehouse to an external server for networking communication.

In examples of the present disclosure, the centralized control system 190 is located external to the housing 120. In examples of the present disclosure, the centralized control system 190 is located in the enclosed space 121 of the housing 120. In examples of the present disclosure, the centralized control system 190 is located in locker assembly 140.

In examples of the present disclosure, a rack is an eRack being virtually addressable with an RFID, a QR code or a barcode. In examples of the present disclosure, a locker is an eLocker being virtually addressable with an RFID, a QR code or a barcode. In examples of the present disclosure, a robot is called ViVi Robot.

Figure 2:
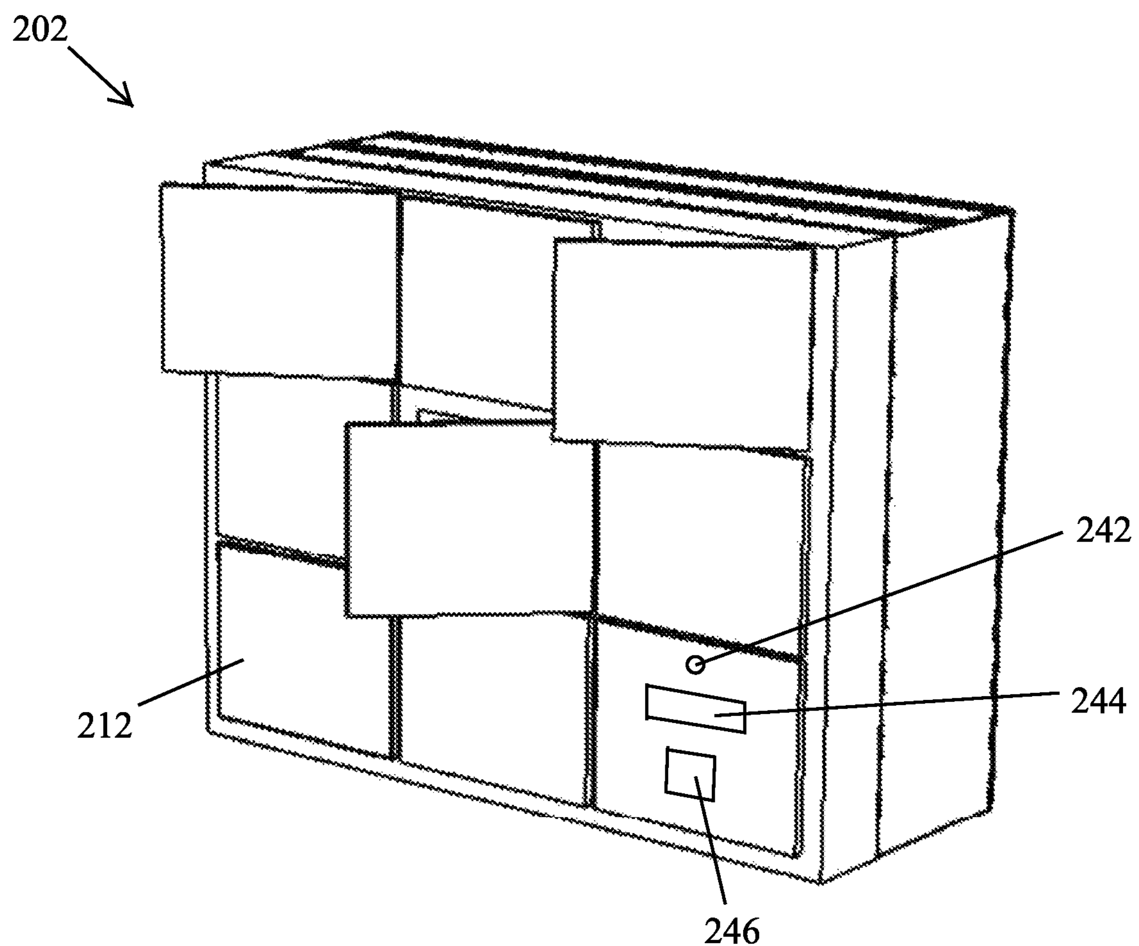
FIG. 2 is a perspective view of a locker assembly in examples of the present disclosure.

FIG. 2 is a perspective view of a locker assembly 202 in examples of the present disclosure. FIG. 2 shows a front side of the locker assembly 202. The locker assembly includes a central control unit 392 of FIG. 3 for locking or unlocking lockers electronically. Each locker has a respective front door 212. Lockers may be in a maximized size or in different sizes. Each locker may have a light or display 244 to indicate an occupancy status. Each locker may be accessed directly from a cellphone application to scan a quick response (QR) code. In examples of the present disclosure, a locker has a sensor assembly 242 to scan a barcode, a QR code or an RFID. The sensor assembly 242 may include a scanner, an image sensor or a temperature sensor. In examples of the present disclosure, a locker has a keypad 246 for a user to enter personal identification (PIN) number. In examples of the present disclosure, the front door 212 of each locker of the locker assembly 202 is equipped with a lock openable by a hardware key; by a software PIN number; or by scanning a QR code.

Figure 3:
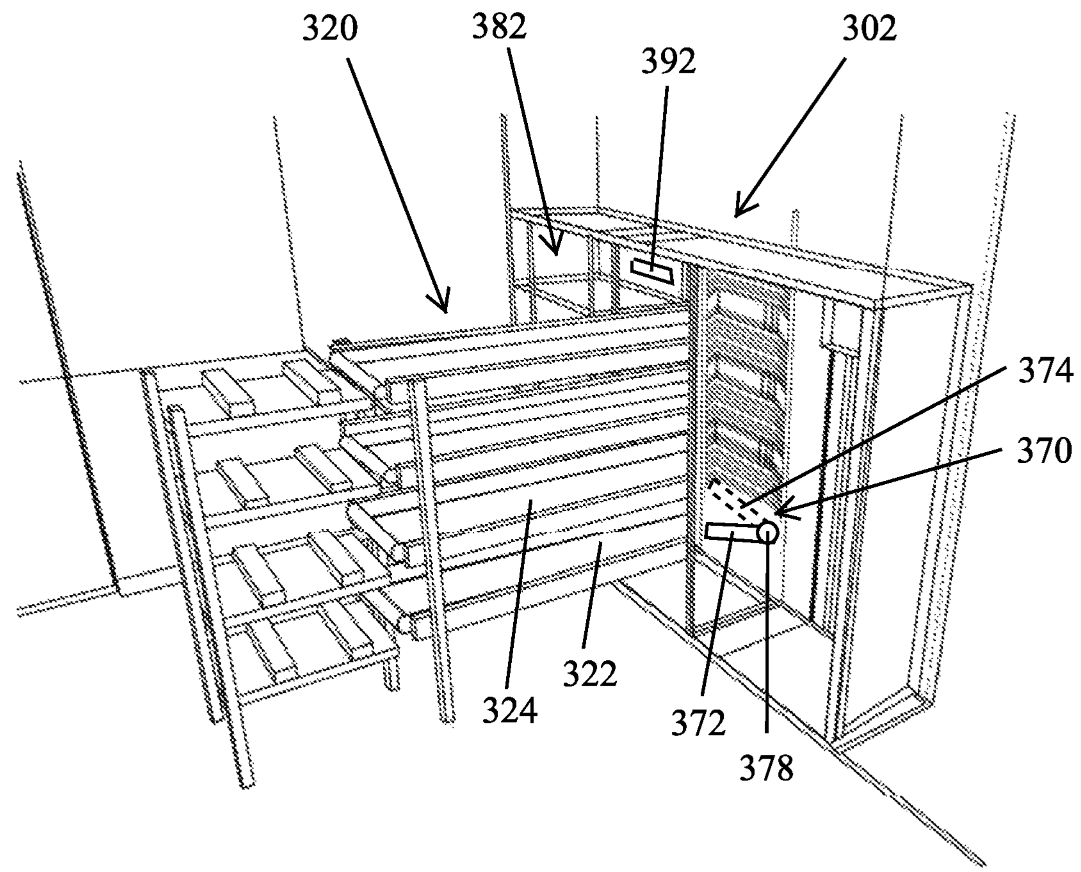
FIG. 3 is a perspective view of another locker assembly in examples of the present disclosure.

FIG. 3 is a perspective view of a locker assembly 302 in examples of the present disclosure. FIG. 3 shows a back side of the locker assembly 302. In one example, a locker does not have a back door. In another example, a locker has a back door 382. The back door 382 is shown in transparent so that internal elements in the locker can be seen. The plurality of robots 180 access the locker assembly 302 to drop off packages or to pick up packages. A plurality of conveyors 320 are connected a back end of the locker assembly 302 supporting batch processing of packages going through the locker assembly 302.

In examples of the present disclosure, the locker assembly 302 further include a plurality of hinged slides. For example, a single hinged slide 370 and 378 is shown in FIG. 3. The hinged slide includes a hinge 378 and a slide 370. The slide 370 is rotatable about the hinge 378. The slide 370 is characterized by a lower position 372 (shown in solid lines) and an upper position 374 (shown in dashed lines). The plurality of conveyors 320 include a first conveyor 322 and a second conveyor 324. The second conveyor 324 is directly above the first conveyor 322. When a package is transported on the second conveyor 324 toward the locker assembly 302, the slide 370 is in the upper position 374. Therefore, the package will slide from the second conveyor 324 down to a respective locker of the locker assembly 302.

When the slide 370 is in the lower position 372, an additional package slides from a respective locker of the locker assembly 302 down to the first conveyor 322. Then, the first conveyor 322 transports the additional package away from the locker assembly 302.

FIG. 4 is a perspective view of a rack assembly 402 and a robot 404 in examples of the present disclosure. The robot 404 carries a pallet 494. A package 492 is on the pallet 494. In one example, the robot 404 has only a single fork-shaped lifter. The robot 404 places the package 492 and the pallet 494 at an empty unit (no existing pallet) of the rack assembly 402. In another example, the robot 500 of FIG. 5 has an upper fork-shaped lifter 520 and a lower fork-shaped lifter 540. The lower fork-shaped lifter 540 picks up the pallet 456 and then the upper fork-shaped lifter 520 places the package 492 and the pallet 494 at the location previously occupied by the pallet 456.

The robot 404 may take a bin from a unit of the rack assembly 402. The bin is held onto the two arms of the fork-shaped lifter of the robot. The rack assembly 402 may include different sized unit spaces for small containers (for example, bins) and for large sized holders (for example, pallets). In examples of the present disclosure, a bottom portion of the pallet 452 is of a character π-shape. A (central) opening of the character π-shape is configured to receive the fork-shaped lifter 520 of FIG. 5. In examples of the present disclosure, a bottom portion of the pallet 452 is of a letter M-shape (similar to the M-shape 640 of FIG. 6).

Figure 5:
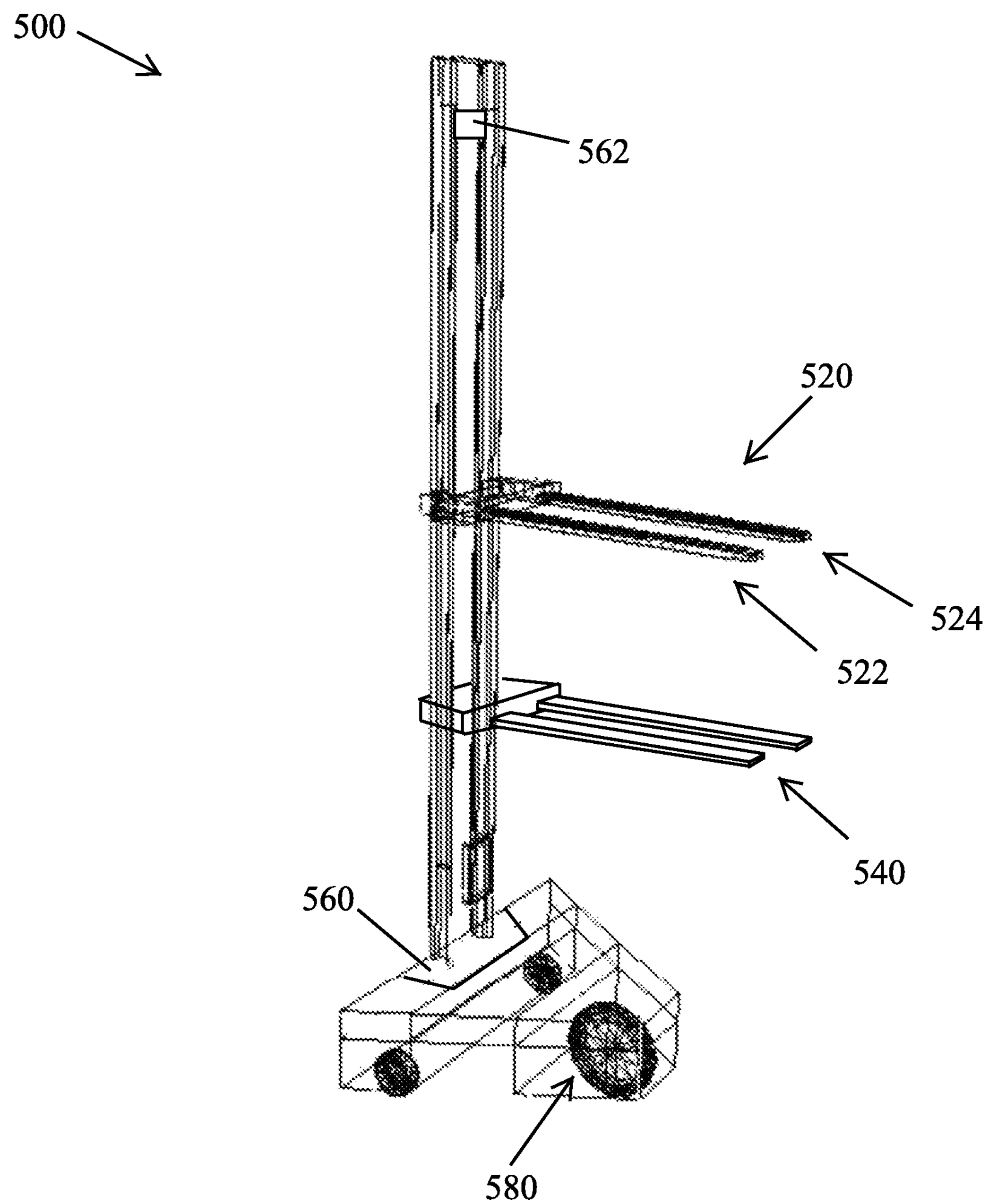
FIG. 5 is a perspective view of another robot in examples of the present disclosure.

FIG. 5 is a perspective view of a robot 500 in examples of the present disclosure. The robot 500 has an upper fork-shaped lifter 520 and a lower fork-shaped lifter 540, a sensor assembly 562, a motor assembly 560 and a plurality of wheels 580. The upper fork-shaped lifter 520 has a first prong 524 and a second prong 522 (a first arm and a second arm). A distance between the first prong 524 and the second prong 522 is adjustable. A height of the upper fork-shaped lifter 520 is adjustable. A height of the lower fork-shaped lifter 540 is adjustable. The sensor assembly 562 transfers image sensor data to the centralized control system 190 through the interface engine 198. The motor assembly 560 drives the plurality of wheels 580, the upper fork-shaped lifter 520 and the lower fork-shaped lifter 540. The sensor assembly 562 may include scanners, image sensors and diodes to receive magnetic, laser, sound and infrared signals.

FIG. 6 is a perspective view of a bin 672 in examples of the present disclosure. The bin 672 has a top portion 602 and a bottom portion of a letter M-shape 640. The letter M-shape 640 comprises a first side leg 652, a central leg 642 and a second side leg 654. A first space 662 between the first side leg 652 and the central leg 642 is configured to receive the first prong 524 of the fork-shape lifter 520 of FIG. 5. A second space between the second side leg 654 and the central leg 642 is configured to receive the second prong 522 of the fork-shape lifter 520.

In examples of the present disclosure, a label of radio-frequency identification (RFID) number is directly attached to an end surface of the central leg 642 of the letter M-shape 640 of the bin 672.

In examples of the present disclosure, a top portion 602 of the bin 672 is of a hollow rectangular prism shape. The top portion 602 of the bin 672 has a top opening 618. The top portion 602 comprises a plurality of walls 620 and a floor 628. For example, in FIG. 6, the top portion 602 of the bin 672 comprises a first bin wall 622, a second bin wall 623, a third bin wall 625 and a fourth bin wall 621. The first bin wall 622 has a letter U-shape cutout 698.

In examples of the present disclosure, the top portion 602 may be mounted on a reduced-size of the letter M-shape bottom portion of the pallet 456 of FIG. 4.

In examples of the present disclosure, the plurality of pallets 452 and the plurality of bins 672 are made of plastic, ABS, wood or metal. A sensor inside a bin or located at a bottom of a bin or a pallet will collect motion data regarding activities inside the bin or on the pallet. The sensor will send the motion data to the centralized control system 190.

Figure 7:
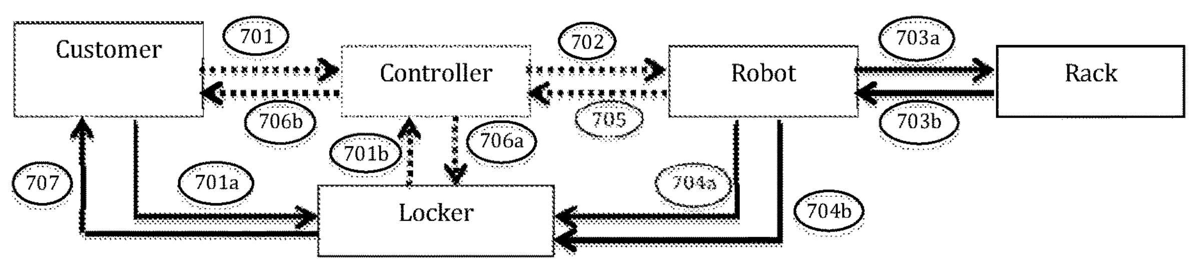
FIG. 7 shows a method of operation of a robotic warehouse in examples of the present disclosure.

FIG. 7 shows a method of operation of a robotic warehouse in examples of the present disclosure. The method of FIG. 7 is for a customer to pick up a package. Dotted lines represent information flows. Solid lines represent physical touches.

For arrow 701, a customer sends a request to the controller through web/app with mailbox ID or package number.

For arrow 701*a*, the customer keys in requests on the locker or scan QR code of a unit of the locker.

For arrow 701*b*, the locker notifies the controller with the request for mail retrieval from the locker unit.

For arrow 702, the controller triggers a robot.

For arrow 703*a*, the robot moves to the rack with the bin of the customer's mailbox.

For arrow 703*b*, the robot loads the bin onto itself.

For arrow 704*a*, the robot moves to the locker and accesses the back door of the requested locker unit.

For arrow 704*b*, the robot unloads the bin into the locker unit.

For arrow 705, the robot notifies the controller for completion of mail delivery.

For arrow 706*a*, the controller unlocks the locker unit.

For arrow 706*b*, the controller notifies the customer that it is ready to pick up mails from the requested/assigned locker unit.

For arrow 707, the customer opens the front door of the locker unit for getting the mails inside.

Figure 8:
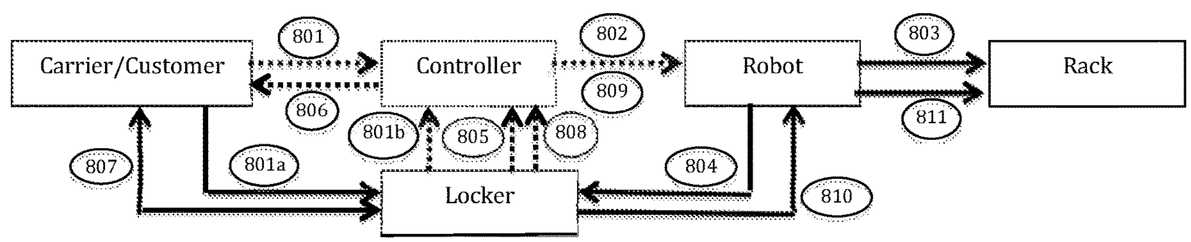
FIG. 8 shows a method of operation of a robotic warehouse in examples of the present disclosure.

FIG. 8 shows a method of operation of a robotic warehouse in examples of the present disclosure. The method of FIG. 8 is for a customer (or a carrier) to drop off a package. Dotted lines represent information flows. Solid lines represent physical touches.

For arrow 801, a carrier sends to the controller through web/app with a request for dropping off a package.

For arrow 801*a*, the carrier keys in the request on the locker or scan QR code of a unit of the locker.

For arrow 801*b*, the locker notifies the controller with the request for a package to be dropped into the locker unit.

For arrow 802, the controller triggers a robot with an empty pallet ID.

For arrow 803, the robot moves to the rack and loads the assigned pallet onto itself.

For arrow 804, the robot moves to the locker, unloads the empty pallet into the unit.

For arrow 805, the locker notifies the controller that the pallet is in the requested/assigned locker unit and then unlocks the front door of the unit.

For arrow 806, the controller notifies the carrier that it is ready to drop off into the requested/assigned locker unit.

For arrow 807, the carrier drops the package into the pallet in the locker unit and secures the front door of the unit.

For arrow 808, the locker notifies the controller that it is ready to transport the package.

For arrow 809, the controller notifies a robot to transport the pallet.

For arrow 810, the robot moves to the back door of the locker unit, loads the pallet onto itself from the locker unit.

For arrow 811, the robot moves to the rack and unloads the pallet to its location on the rack.

During a rental period (for example, six months, one year or two years), a user (or a person authorized by the user) uses a key to open a mailbox at a post office and gets items. The mailbox is not shared. The mailbox is solely designated to the user during the rental period. In examples of the present disclosure, for improved efficiency, the lockers of the locker assembly 140 of FIG. 1 of the present disclosure may be shared by a plurality of users. Within a time period (for example, twenty minutes, forty minutes or one hour), the plurality of robots 180 deliver a first item to a designated locker of the first plurality of lockers 142 of the locker assembly 140; a first user uses a first code or identification (ID) to open a front door of the designated locker of the first plurality of lockers 142 of the locker assembly 140 and picks up the first item; the plurality of robots 180 deliver a second item to the designated locker of the first plurality of lockers 142 of the locker assembly 140; a second user uses a second CODE OR ID to open the front door of the designated locker of the first plurality of lockers 142 of the locker assembly 140 and picks up the second item; the plurality of robots 180 deliver a third item to a designated locker of the first plurality of lockers 142 of the locker assembly 140; and a third user uses a third CODE OR ID to open the front door of the designated locker of the first plurality of lockers 142 of the locker assembly 140 and picks up the third item. In examples of the present disclosure, the first user, the second user and the third user are different persons. The first CODE OR ID, the second CODE OR ID and the third CODE OR ID are different.

In examples of the present disclosure, within a time period (for example, twenty minutes, forty minutes or one hour), a first user uses a first CODE OR ID to open a front door of a designated locker of the first plurality of lockers 142 of the locker assembly 140 and drops off a first item; the plurality of robots 180 take the first item from the designated locker of the first plurality of lockers 142 of the locker assembly 140 to the rack assembly 160; a second user uses a second CODE OR ID to open the front door of the designated locker of the first plurality of lockers 142 of the locker assembly 140 and drops off a second item; the plurality of robots 180 take the second item from the designated locker of the first plurality of lockers 142 of the locker assembly 140 to the rack assembly 160; a third user uses a third CODE OR ID to open the front door of the designated locker of the first plurality of lockers 142 of the locker assembly 140 and drops off a third item; the plurality of robots 180 take the third item from the designated locker of the first plurality of lockers 142 of the locker assembly 140 to the rack assembly 160.

A designated locker can be used for the customers to drop off or to pick items during a same time period. In examples of the present disclosure, within a time period (for example, twenty minutes, forty minutes or one hour), a first user uses a first CODE OR ID to open a front door of a designated locker of the first plurality of lockers 142 of the locker assembly 140 and drops off a first item; the plurality of robots 180 take the first item from the designated locker of the first plurality of lockers 142 of the locker assembly 140 to the rack assembly 160; the plurality of robots 180 deliver a second item to the designated locker of the first plurality of lockers 142 of the locker assembly 140; a second user uses a second CODE OR ID to open the front door of the designated locker of the first plurality of lockers 142 of the locker assembly 140 and picks up the second item; a third user uses a third CODE OR ID to open the front door of the designated locker of the first plurality of lockers 142 of the locker assembly 140 and drops off a third item; the plurality of robots 180 take the third item from the designated locker of the first plurality of lockers 142 of the locker assembly 140 to the rack assembly 160.

Those of ordinary skill in the art may recognize that modifications of the embodiments disclosed herein are possible. For example, a number of the robots may vary. A number of the pallets may vary. A number of the bins may vary. Other modifications may occur to those of ordinary skill in this art, and all such modifications are deemed to fall within the purview of the present invention, as defined by the claims.

The invention claimed is:

1. A robotic warehouse comprising:

a housing having an enclosed space, the housing comprising:
 a ceiling;
 a plurality of walls comprising a first wall; and
 a floor;

a plurality of pallets; each of the plurality of pallets having a first size;

a plurality of bins; each of the plurality of bins having a second size; the second size being smaller than the first size;

a rack assembly disposed in the enclosed space of the housing; the rack assembly having a first plurality of units and a second plurality of units; each of the first plurality of units being configured to receive one of the plurality of pallets; each of the second plurality of units being configured to receive one of the plurality of bins;

a plurality of robots movable in the enclosed space of the housing; and a locker assembly comprising a first plurality of lockers, each locker of the first plurality of lockers having a front door.

2. The robotic warehouse of claim 1, wherein the locker assembly further comprises a second plurality of lockers; each locker of the second plurality of lockers has a front door; each of the first plurality of lockers is configured to receive a selected one of the plurality of pallets; each of the second plurality of lockers is configured to receive a selected one of the plurality of bins;

wherein the first wall of the plurality of walls has an opening to receive a front end of the locker assembly so that the front door of each locker of the first plurality of lockers and the second plurality of lockers is accessible from an exterior of the housing and a back end of the locker assembly is disposed in the enclosed space of the housing; and wherein the robotic warehouse is characterized by:

a first condition in which
 a customer drops off a first package on a first pallet in a first locker of the first plurality of lockers; and
 the plurality of robots move the first package on the first pallet from the first locker to a first unit of the first plurality of units of the rack assembly;

a second condition in which
 the customer drops off a second package in a first bin in a second locker of the second plurality of lockers; and
 the plurality of robots move the second package in the first bin from the second locker to a second unit of the second plurality of units of the rack assembly;

a third condition in which
 the plurality of robots move a third package on a second pallet from a third unit of the first plurality of units of the rack assembly to a third locker of the first plurality of lockers; and
 the customer picks up the third package on the second pallet from the third locker of the first plurality of lockers; and a fourth condition in which
 the plurality of robots move a fourth package in a second bin from a fourth unit of the second plurality of units of the rack assembly to a fourth locker of the second plurality of lockers; and
 the customer picks up the fourth package in the second bin from the fourth locker of the second plurality of lockers.

3. The robotic warehouse of claim 2, wherein the robotic warehouse excludes a container other than the first size and the second size so that a package of the customer not fitting into the first size will be rejected.

4. The robotic warehouse of claim 2 further comprising a centralized control system comprising a processor processing data;

memory storing the data;

an artificial intelligence engine specifying a plurality of routes of the plurality of robots and avoiding collisions of the plurality of robots; and an interface engine communicating with a plurality of users and the plurality of robots.

5. The robotic warehouse of claim 4, wherein each of the plurality of robots is equipped with a sensor assembly comprising a plurality of scanners, a plurality of image sensors and a plurality of diodes to receive magnetic, laser, sound and infrared signals so as to transfer sensor data to the centralized control system through the interface engine.

6. The robotic warehouse of claim 2, wherein each of the plurality of robots has a fork-shaped lifter and a plurality of wheels;

wherein a height of the fork-shaped lifter is adjustable;

wherein a bottom portion of each of the plurality of pallets is of a character $\pi$-shape;

wherein a bottom portion of each of the plurality of bins is of the character $\pi$-shape;

wherein an opening of the character $\pi$-shape is configured to receive the fork-shaped lifter; and wherein a respective label of radio-frequency identification (RFID) number is directly attached to a middle portion of a flat top portion of the character $\pi$-shape of each of the plurality of pallets and each of the plurality of bins.

7. The robotic warehouse of claim 2, wherein each of the plurality of robots has a fork-shaped lifter;
wherein the fork-shaped lifter has a first prong and a second prong;
wherein a distance between the first prong and the second prong is adjustable;
wherein a bottom portion of each of the plurality of pallets is of a letter M-shape;
wherein a bottom portion of each of the plurality of bins is of the letter M-shape;
wherein the letter M-shape comprises a first side leg, a central leg and a second side leg;
wherein a first space between the first side leg and the central leg is configured to receive the first prong of the fork-shaped lifter;
wherein a second space between the second side leg and the central leg is configured to receive the second prong of the fork-shaped lifter; and
wherein a respective label of radio-frequency identification (RFID) number is directly attached to an end surface of the central leg of the letter M-shape of each of the plurality of pallets and each of the plurality of bins.

8. The robotic warehouse of claim 7, wherein a top portion of each of the plurality of bins is of a hollow rectangular prism shape;
wherein the top portion of each of the plurality of bins comprises
a first bin wall;
a second bin wall;
a third bin wall;
a fourth bin wall; and
a top opening; and
wherein the first bin wall has a letter U-shape cutout.

9. The robotic warehouse of claim 2, wherein the plurality of pallets and the plurality of bins are made of plastic, acrylonitrile butadiene styrene (ABS), wood or metal.

10. The robotic warehouse of claim 2, wherein each of the plurality of robots has a first fork-shaped lifter and a second fork-shaped lifter.

11. The robotic warehouse of claim 10, wherein the robotic warehouse is characterized by:
the first condition in which
after the customer dropping off the first package on the first pallet in the first locker of the first plurality of lockers, the second fork-shaped lifter of a first selected robot of the plurality of robots picks up an empty pallet;
the first fork-shaped lifter of the first selected robot of the plurality of robots picks up the first package on the first pallet from the first locker of the first plurality of lockers; and
the second fork-shaped lifter of the first selected robot of the plurality of robots drops off the empty pallet in the first locker of the first plurality of lockers; and
the second condition in which
after the customer dropping off the second package in the first bin in the second locker of the second plurality of lockers, the second fork-shaped lifter of a second selected robot of the plurality of robots picks up an empty bin;
the first fork-shaped lifter of the second selected robot of the plurality of robots picks up the second package in the first bin from the second locker of the second plurality of lockers; and
the second fork-shaped lifter of the second selected robot of the plurality of robots drops off the empty bin in the second locker of the second plurality of lockers.

12. The robotic warehouse of claim 2, wherein the front door of each locker of the first plurality of lockers and the second plurality of lockers is equipped with a lock openable by a hardware key; by a software personal identification (PIN) number; or by scanning a quick response (QR) code.

13. The robotic warehouse of claim 2 further comprising a plurality of guiding tracks on the floor so that the plurality of robots move along the plurality of guiding tracks on the floor.

14. The robotic warehouse of claim 2 further comprising a plurality of conveyers directly attached to a back side of the locker assembly;
wherein the locker assembly further comprises a plurality of hinged slides comprising a first hinged slide;
wherein the first hinged slide comprises a first hinge and a first slide rotatable about the first hinge;
wherein the plurality of conveyers comprises a first conveyor and a second conveyor directly above the first conveyor; and
wherein the first slide is characterized by:
an upper position in which
the first slide is configured to receive a first selected package from the second conveyor; and
a lower position in which
the first slide is configured to deliver a second selected package from a selected locker of the locker assembly to the first conveyor.

15. A method of using the robotic warehouse of claim 2, wherein
under the first condition in which
the customer drops off the first package on the first pallet in the first locker of the first plurality of lockers; and
the plurality of robots move the first package on the first pallet from the first locker to the first unit of the first plurality of units of the rack assembly;
under the second condition in which
the customer drops off the second package in the first bin in the second locker of the second plurality of lockers; and
the plurality of robots move the second package in the first bin from the second locker to the second unit of the second plurality of units of the rack assembly;
under the third condition in which
the plurality of robots move the third package on the second pallet from the third unit of the first plurality of units of the rack assembly to the third locker of the first plurality of lockers; and
the customer picks up the third package on the second pallet from the third locker of the first plurality of lockers; and
under the fourth condition in which
the plurality of robots move the fourth package in the second bin from the fourth unit of the second plurality of units of the rack assembly to the fourth locker of the second plurality of lockers; and
the customer picks up the fourth package in the second bin from the fourth locker of the second plurality of lockers.

16. The method of claim 15, wherein
under the first condition in which
before the customer dropping off the first package on the first pallet in the first locker of the first plurality of lockers, the customer sends a request to a centralized control system to drop off the first package;

the centralized control system informs the customer a first identification number of the first locker of the first plurality of lockers and a first software personal identification (PIN) number; or a first quick response (QR) code; and the customer uses the first software PIN number or scans the first QR code to unlock the front door of the first locker of the first plurality of lockers; and under the second condition in which before the customer dropping off the second package in the first bin in the second locker of the second plurality of lockers, the customer sends another request to the centralized control system to drop off the second package;

the centralized control system informs the customer a second identification number of the second locker of the second plurality of lockers and a second software PIN number; or a second QR code; and the customer uses the second software PIN number or scans the second QR code to unlock the front door of the second locker of the second plurality of lockers.

17. The method of claim 16, wherein under the third condition in which before the plurality of robots moving the third package on the second pallet from the third unit of the first plurality of units of the rack assembly to the third locker of the first plurality of lockers, the customer sends the centralized control system a predetermined time period to pick up;

the centralized control system informs the customer a third identification number of the third locker of the first plurality of lockers and a third software PIN number; or a third QR code; and before the customer picking up the third package on the second pallet from the third locker of the first plurality of lockers, the customer uses the third software PIN number or scans the third QR code to unlock the front door of the third locker of the first plurality of lockers; and under the fourth condition in which before the plurality of robots move the fourth package in the second bin from the fourth unit of the second plurality of units of the rack assembly to the fourth locker of the second plurality of lockers, the customer sends the centralized control system another predetermined time period to pick up;

the centralized control system informs the customer a fourth identification number of the fourth locker of the second plurality of lockers and a fourth software PIN number; or a fourth QR code; and before the customer picks up the fourth package in the second bin from the fourth locker of the second plurality of lockers, the customer uses the fourth software PIN number or scans the fourth QR code to unlock the front door of the fourth locker of the second plurality of lockers.

18. The method of claim 17, wherein a first user uses a first code or identification (ID) to open a front door of a designated locker of the first plurality of lockers of the locker assembly and picks up a first item;

wherein a second user uses a second CODE OR ID to open the front door of the designated locker of the first plurality of lockers of the locker assembly and picks up a second item;

wherein a third user uses a third CODE OR ID to open the front door of the designated locker of the first plurality of lockers of the locker assembly and picks up a third item;

wherein the first user is different from the second user;

wherein the second user is different from the third user;

wherein the first CODE OR ID is different from the second CODE OR ID;

wherein the second CODE OR ID is different from the third CODE OR ID; and wherein a duration between the first user opened the front door of the designated locker and the second user opened the front door of the designated locker is less than one hour.

19. A system comprising:

a front-end access area comprising a plurality of front-end access units;

a back-end storage area comprising a plurality of back-end storage units;

a plurality of robots transporting a plurality of mails, a plurality of parcels, a plurality of packages and a plurality of cartons between the front-end access area and the back-end storage area or between a first sub-storage area of the back-end storage area and a second sub-storage area of the back-end storage area;

wherein a number of the plurality of front-end access units is less than a number of the plurality of back-end storage units;

wherein the plurality of front-end access units are accessed by a plurality of customers from front sides of the plurality of front-end access units;

wherein a selected front-end access unit of the plurality of front-end access units is accessed by a first customer at a first predetermined time and is accessed by a second customer at a second predetermined time;

wherein a first duration that the selected front-end access unit containing a mail, a parcel, a package or a carton is shorter than a second duration that the selected front-end access unit not containing the mail, the parcel, the package or the carton;

wherein the plurality of back-end storage units are configured to store the plurality of mails, the plurality of parcels, the plurality of packages and the plurality of cartons;

wherein the back-end storage area is not accessible to the plurality of customers;

wherein the plurality of robots deliver the plurality of mails, the plurality of parcels, the plurality of packages and the plurality of cartons to the plurality of front-end access units;

wherein the plurality of mails, the plurality of parcels, the plurality of packages and the plurality of cartons will be picked up by the plurality of customers within thirty minutes; and wherein the plurality of robots will transport the plurality of mails, the plurality of parcels, the plurality of packages and the plurality of cartons from the plurality of front-end access units to the plurality of back-end storage units if the plurality of customers do not pick up the plurality of mails, the plurality of parcels, the plurality of packages and the plurality of cartons within thirty minutes.

20. A robotic warehouse comprising:

a housing having an enclosed space, the housing comprising:
- a ceiling;
- a plurality of walls comprising a first wall; and
- a floor;

a plurality of pallets;

a plurality of bins;

a rack assembly disposed in the enclosed space of the housing; the rack assembly having a plurality of units; each of the plurality of units being configured to receive one of the plurality of pallets or one of the plurality of bins;

a plurality of robots movable in the enclosed space of the housing; and a locker assembly comprising a plurality of lockers, each locker of the plurality of lockers having a front door.

* * * * *